United States Patent [19]

McCarty et al.

[11] Patent Number: 4,536,694

[45] Date of Patent: Aug. 20, 1985

[54] BATTERY-OPERATED DEVICE WITH WALL-MOUNTED SUPPORT

[75] Inventors: George W. McCarty, Lutherville; Jerome I. Rebold, Burtonsville; Somers H. Smith, III, Columbia, all of Md.

[73] Assignee: Solid State Chargers Research and Development, Lutherville, Md.

[21] Appl. No.: 581,774

[22] Filed: Feb. 21, 1984

[51] Int. Cl.³ .................... H02J 7/00; H05K 7/20; H01M 45/04

[52] U.S. Cl. .................................. 320/2; 174/54; 361/388

[58] Field of Search .................... 320/2-5; 174/54, 55; 339/122 R; 307/149, 150; 361/388, 389; 15/DIG. 1

[56] References Cited

U.S. PATENT DOCUMENTS

| | | | |
|---|---|---|---|
| 3,320,508 | 5/1967 | Bradshaw et al. | 320/2 |
| 3,349,310 | 10/1967 | Ladoniczki | 320/DIG. 2 |
| 3,473,859 | 10/1969 | Kircher | 320/2 X |
| 3,684,941 | 8/1972 | Van Acker et al. | 320/2 |
| 3,710,224 | 1/1973 | Daniels | 320/2 |
| 4,039,900 | 8/1977 | Roback et al. | 361/388 |

FOREIGN PATENT DOCUMENTS 2072969 10/1981 United Kingdom .................... 320/2

Primary Examiner—R. J. Hickey
Attorney, Agent, or Firm—Leonard Bloom

[57] ABSTRACT

A battery-operated device having a passive charging mode and an active discharging mode is combined with a support, which supports the device in its charging mode. The support is integral with a plate which is to be positioned on a wall. The plate may be a replacement cover plate which may be substituted for a cover plate of a conventional A.C. wall outlet. The device includes a short power cord having a plug at its distal end. A D.C. current pulse producing circuit, preferably a solid state integrated circuit is housed within the plug. The D.C. current pulse producing circuit is especially useful as a battery-charging circuit.

39 Claims, 32 Drawing Figures

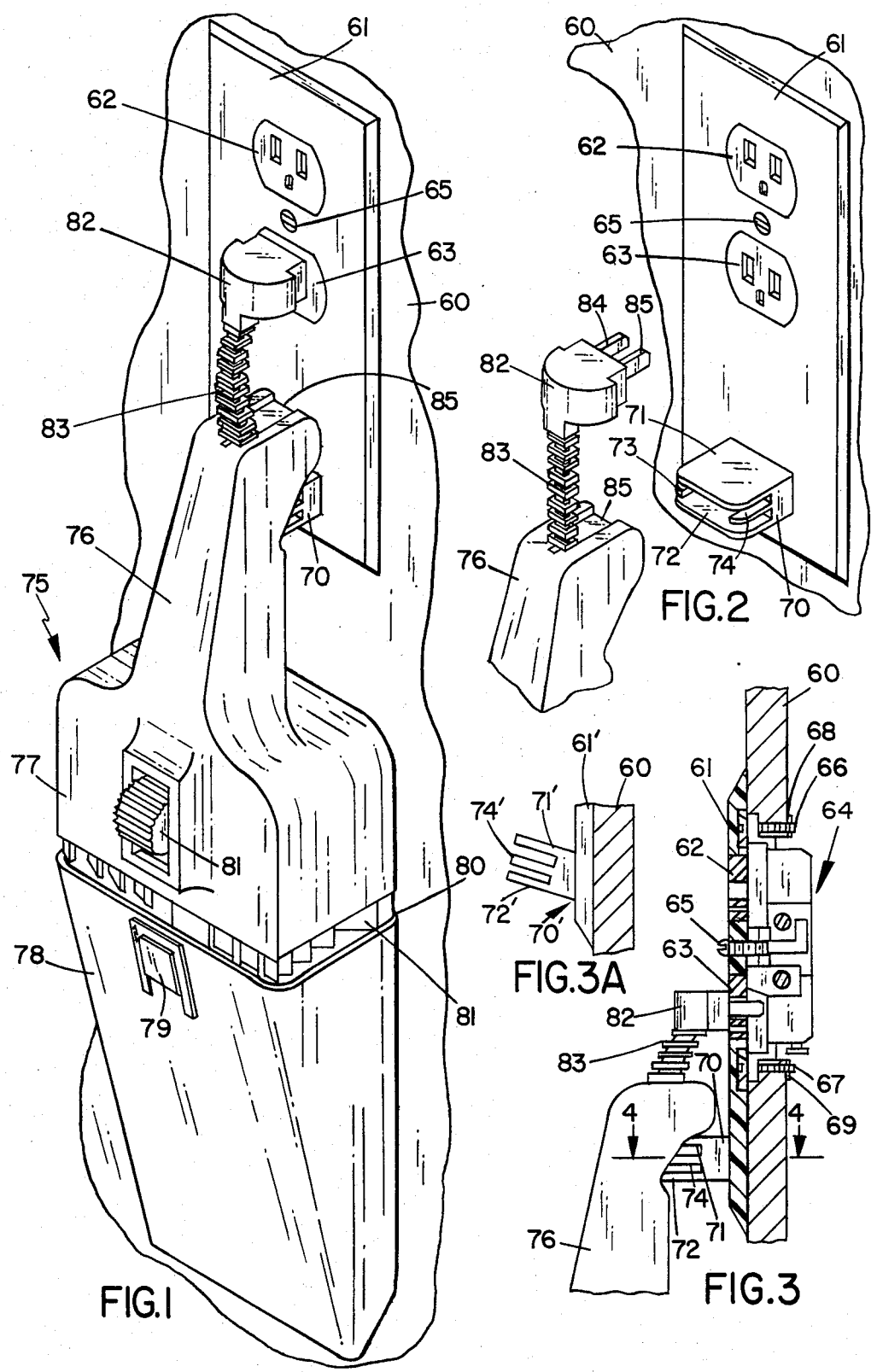

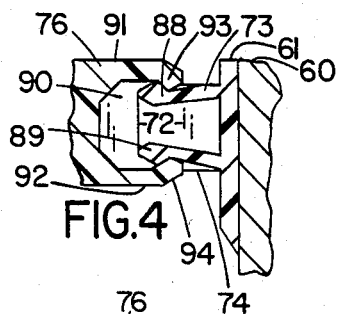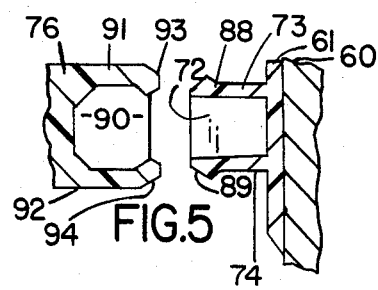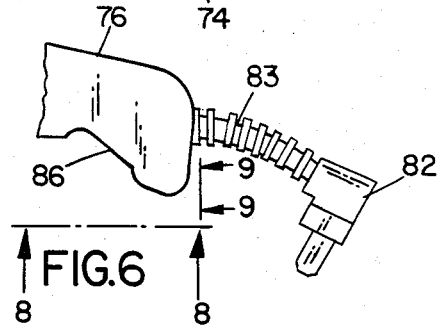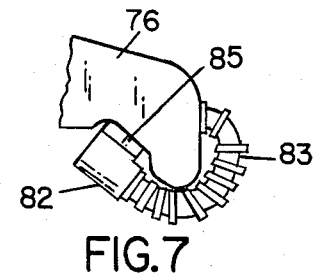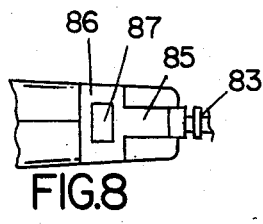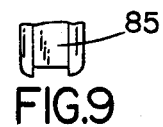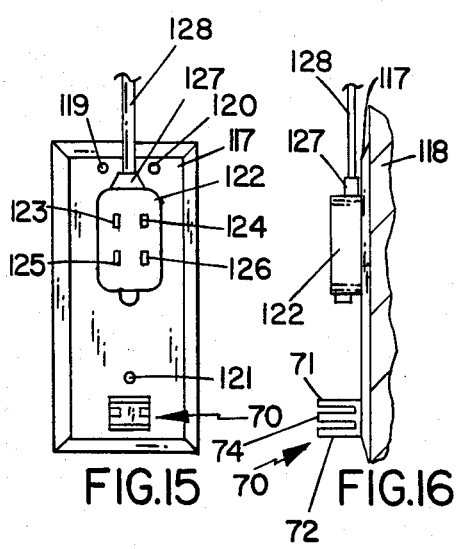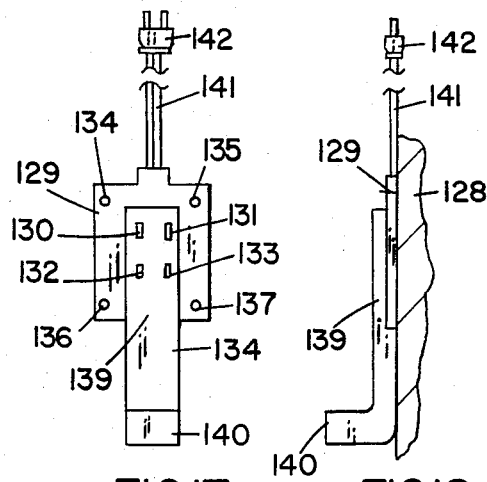

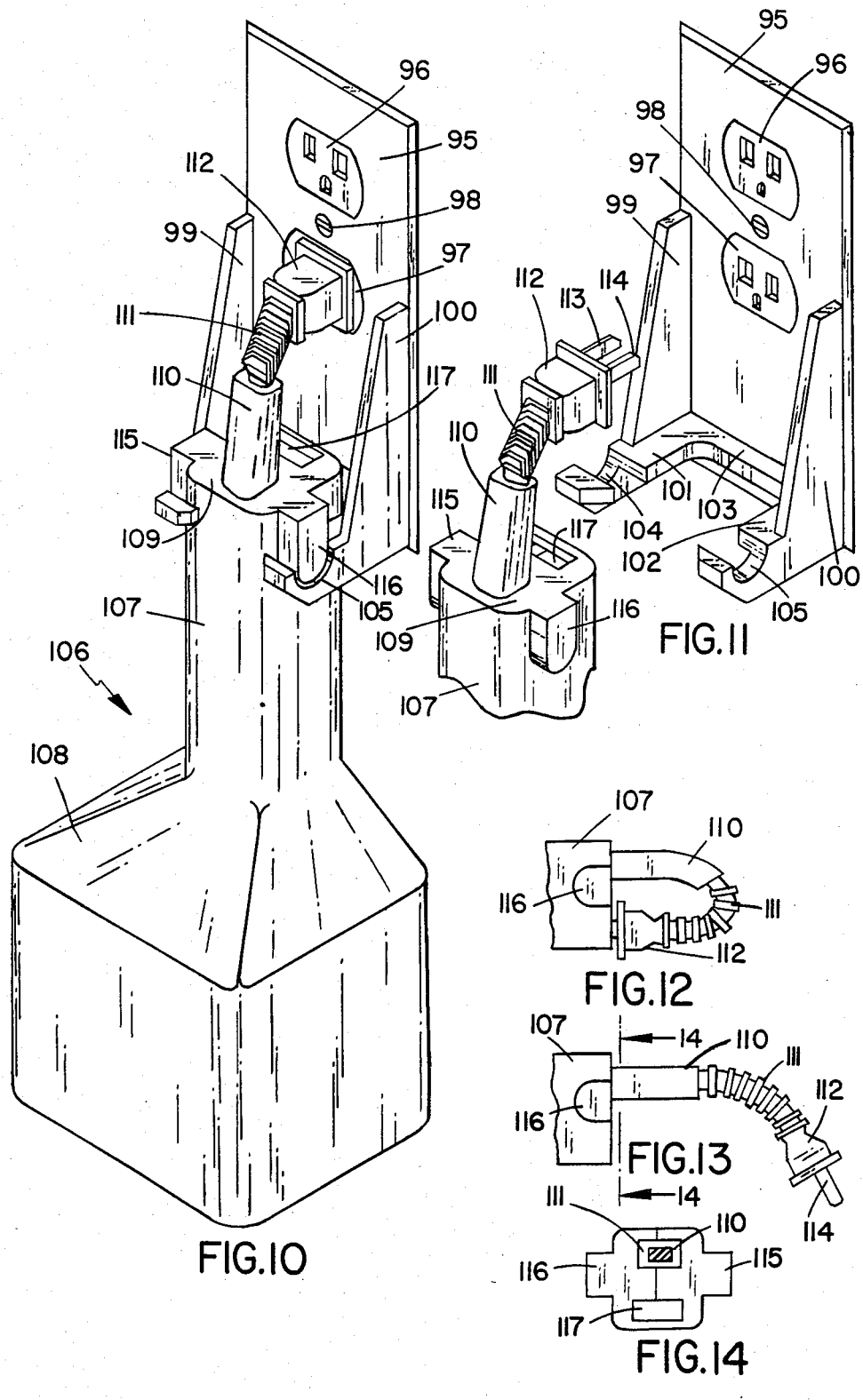

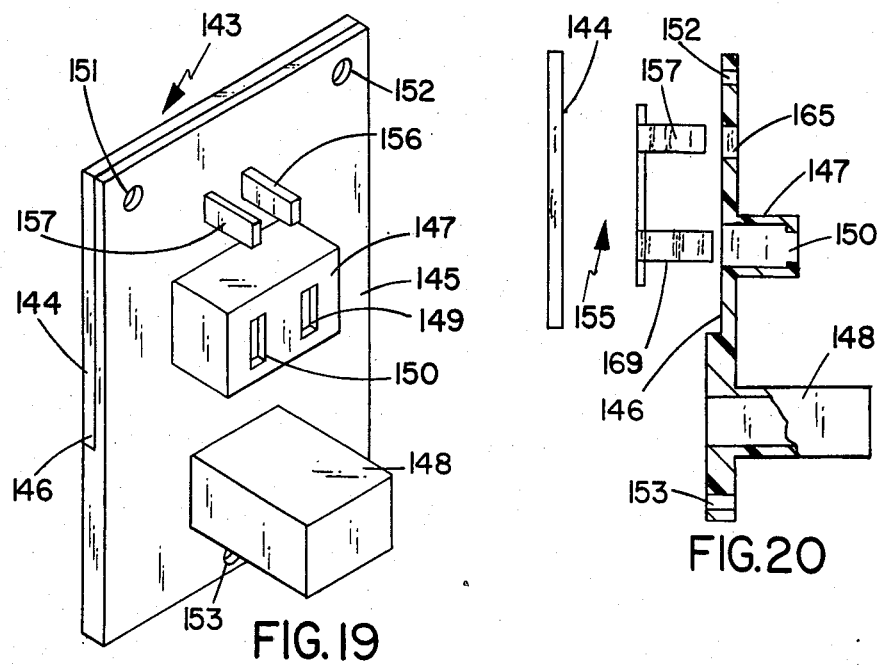
FIG.19
FIG.20
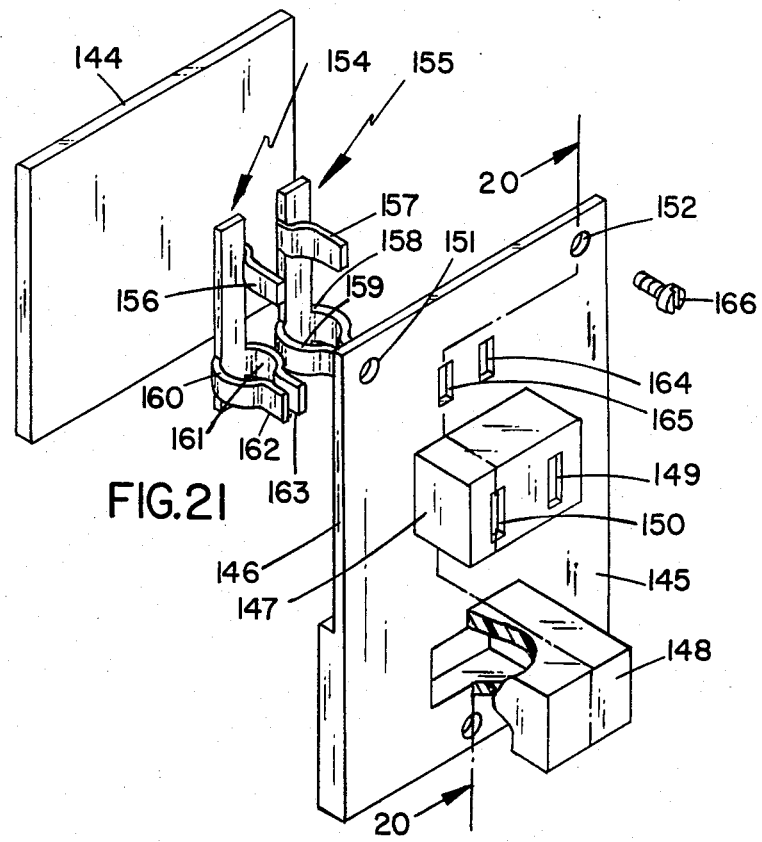
FIG.21

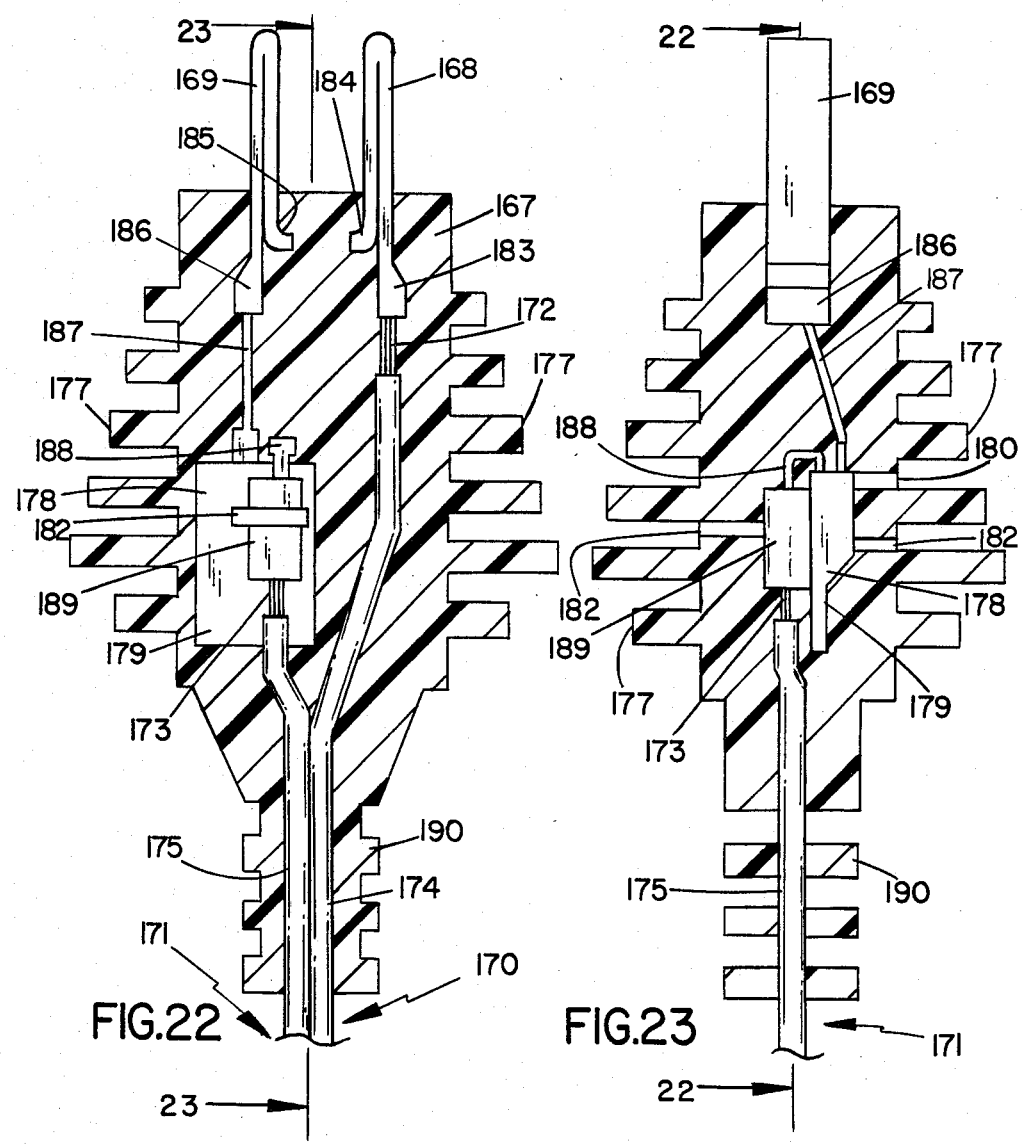
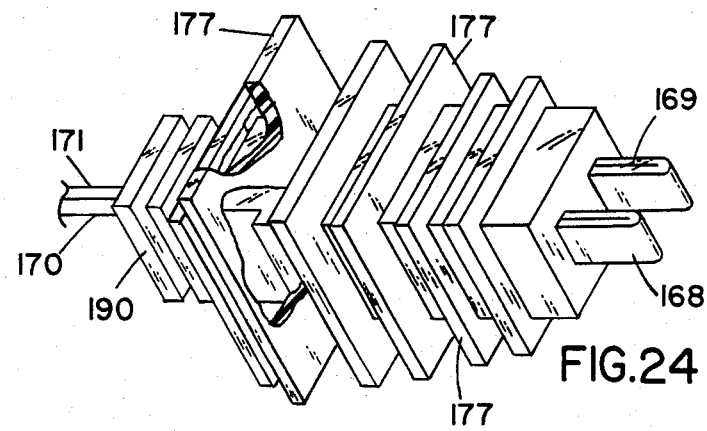
FIG.22  FIG.23  FIG.24

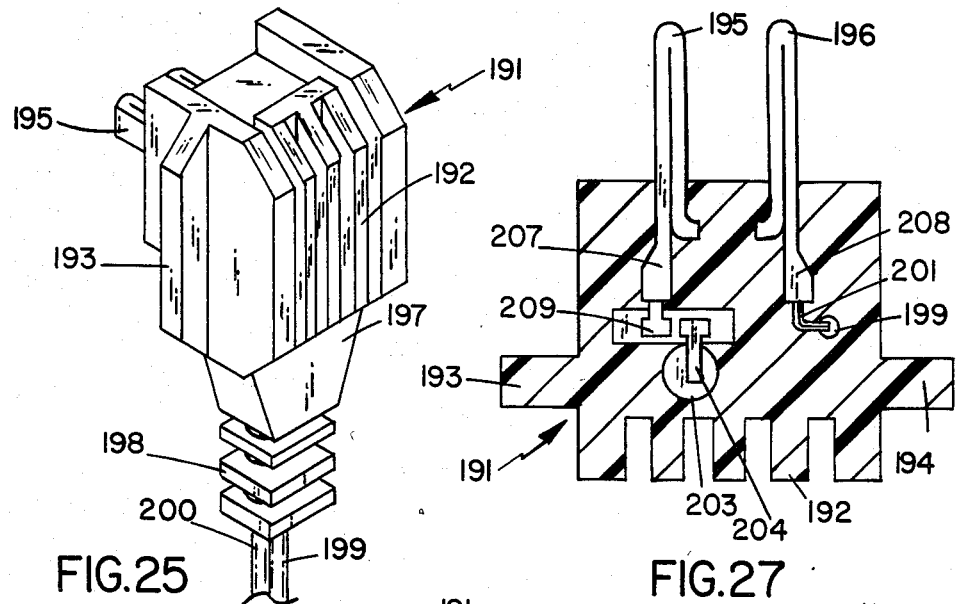
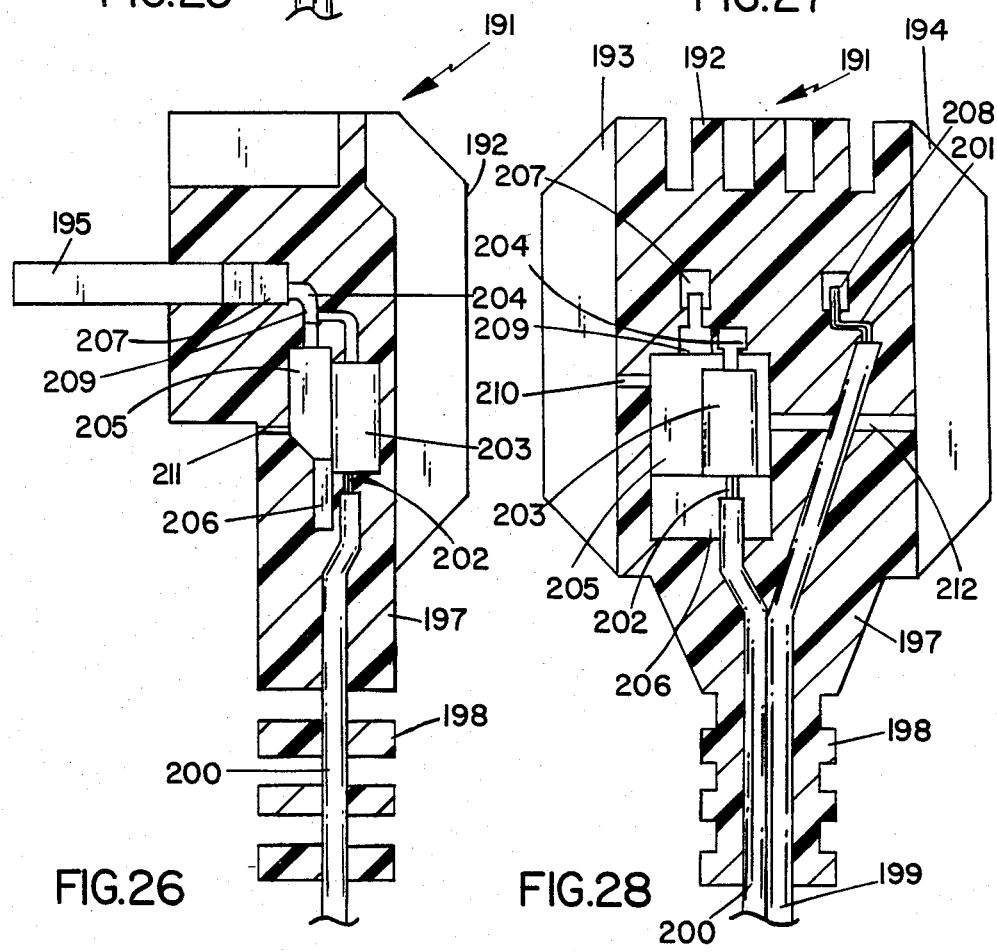
FIG.25  FIG.27  FIG.26  FIG.28

BATTERY-OPERATED DEVICE WITH WALL-MOUNTED SUPPORT

BACKGROUND OF THE INVENTION

This invention relates to a battery-operated device having a passive mode, when the device is being charged, and an active mode, when the device is being discharged. The device is associated with a wall-mounted support. The invention relates, more particularly, to such a battery-operated device which includes a charging circuit for the batteries therein and an electrical cord with an associated plug which is to be inserted into an A.C. receptacle.

While not restricted thereto, the invention finds immediate application in conjunction with portable battery-operated devices such as vacuum operated cleaning appliances, flashlights, soldering pencils, shavers, portable telephones, calculators, computers, television sets, radios, recorders, electric garden tools, and tools including woodworking and metalworking tools, dental appliances and the like. More particularly, the present invention finds direct application in portable battery-operated devices which are provided with battery-charging circuits which are small, simple, inexpensive and may be readily incorporated directly into the portable devices.

Battery-operated portable devices, such as hand tools, have considerable popularity because of the convenience afforded by these devices. Devices of this type are customarily provided with a small D.C. electric drive motor which is energized by one or more rechargeable batteries incorporated within the tool housing and operatively associated with the electric drive motor. When a device is a flashlight, soldering pencil, portable telephone, calculator, computer, television set, radio or the like, the rechargeable battery or batteries within the device are operatively arranged to provide D.C. power to the circuits thereof rather than to a small D.C. electric drive motor.

Battery-operated portable devices and appliances, such as hand tools, and which include a battery or battery pack within the housing of the device or appliance are well known. It is well known to develop the housing of a device or appliance so that it may be suitably juxtapositioned adjacent a so-called saddle which contains therein a rectifying circuit for supplying low-voltage D.C. to the battery or battery pack for recharging the batteries therein. The saddle includes low-voltage, low current electrically conductive connectors which, when the device or appliance is positioned in the saddle, make contact with corresponding connectors of the device or appliance so as to provide D.C. current to the battery or battery pack when one seeks to recharge the batteries therein. The saddle is relatively large and clumsy. Furthermore, the saddle has a long electrical extension cord connected thereto. The cord terminates in a power plug on its distal end which is to be plugged into a conventional A.C. receptacle.

These known saddle arrangements are of considerable size, are expensive and require special mounting provisions so that the saddle may be positioned directly on a wall or the like. Moreover, the extension cord, which is usually fixedly attached to the saddle often times is unnecessarily long for some installations, resulting in an increase in the cost of the saddle arrangement, and often poses an inconvenience because the long cord dangles on the floor, providing a hazard to people walking about, who may trip over the cord thereby possibly injuring themselves, damaging the cord, the saddle or an appliance held therein, or even loosening or pulling the saddle completely off the wall.

It is known from the U.S. Pat. No. 4,409,536 issued Oct. 11, 1983 to John N. Evjen and entitled "Support Means For Plug-In Transformer/Charger" to provide a direct plug-in charging system which includes a transformer and rectifier within a housing, in the shape substantially of a cube, and which includes a pair of prongs extending therefrom which can be engaged in a conventional A.C. outlet. Also extending from a major surface of the housing are three button connectors operatively positioned with respect to each other so as to receive corresponding female connectors associated with a battery pack so that the battery pack can be conductively fixed in place to the housing. Velcro means are provided between a portion of a wall plate and the housing to aid in supporting the housing and its associated battery pack.

It is known from U.S. Pat. No. 3,473,859 issued Oct. 21, 1969 to Paul J. Kircher and entitled "Support Structure For Domestic Appliance" to support a battery-powered appliance, such as a toothbrush within a recess in the upper-surface of a housing, which also forms a support which is to be mounted on a wall or placed on a counter top. A cord extends from the housing, terminating in a power plug which includes a pair of prongs extending therefrom which may be inserted into a conventional A.C. receptacle, a step down transformer and rectifier being housed within the power plug. The support includes a mounting member which may be removeably attached by screws, lag bolts or the like over a cover plate behind which the A.C. receptacle is positioned. When mounted, the housing and support as well as the plug are distinct from the portable appliance within which the battery or battery pack may is positioned.

Of interest is illustrating the general prior art, are a number of U.S. patents identified as follows:

| U.S. Pat. No. | Inventor(s) | Issue Date |
| --- | --- | --- |
| Des. 184,263 | McCarthy | January 13, 1959, |
| Des. 198,132 | Radtke et al. | May 5, 1964, |
| 1,834,795 | Morse | December 1, 1931, |
| 1,981,210 | Wheat | November 20, 1934, |
| 2,430,514 | Knavez | November 11, 1947, |
| 2,943,138 | Reager | June 28, 1960, |
| 3,042,739 | Craig | July 3, 1962, |
| 3,331,915 | Lucci | July 18, 1967, and |
| 4,335,863 | Rapps | June 22, 1982. |

SUMMARY OF THE INVENTION

An object of the present invention is to provide a battery-operated device, which has a passive mode when it is being charged and an active mode when it is being discharged, with a support arrangement so that it may be supported and recharged in its passive mode.

Another object of the present invention is to provide a battery-operated device, which has a passive mode when it is being charged and an active mode when it is being discharged with a support arrangement in the form of a replacement cover plate for an A.C. electrical wall outlet.

An additional object of the present invention is to provide a battery-operated device, which has a passive mode when it is being charged and an active mode when it is being discharged, with a support arrangement to support the device while it is being recharged, the device including a short power cord having a plug on its distal end.

A further object of the present invention is to provide a battery-operated device, which has a passive mode when it is being recharged and an active mode when it is being discharged, with a support arrangement and a compact, economical battery charger for recharging the batteries or battery within the device.

Yet another object of the present invention is to provide a battery-operated device, which has a passive mode when it is being recharged and an active mode when it is being discharged, with a support for the device when it is being recharged, the device and support being free of long power cords and thus less dangerous.

Yet an additional object of the present invention is to provide a wall outlet storage arrangement for a battery operated device which has a passive mode, when it is being charged and an active mode when it is being discharged.

In one aspect, the invention is in a battery-operated device having a passive mode when the device is being charged and an active mode when the device is being discharged in use. A support includes a plate means, means for mounting the plate means on a wall, electrical outlet receptacle means associated with the plate means, means on the plate means for removably supporting the battery-operated device on the wall. Charging means are provided within the battery-operated device, the battery-operated device including an electrical cord connected to the charging means. A plug is provided on the end of the cord for cooperation with the receptacle means in the charging mode of the battery-operated device.

The invention can be viewed as a combination of a battery-operated device and a replacement cover plate. The battery-operated device has a passive mode when the device is being charged and an active mode when the device is being discharged in use. The battery-operated device has a housing including a rearwardly-projecting handle having a rearmost end portion provided with laterally projecting respective ears, a relatively short electrical cord carried by the handle and a projecting short electrical cord carried by the handle and projecting rearwardly of the end portion thereof. The replacement cover plate can be fit over at least one wall-mounted electrical outlet receptacle. The replacement cover plate has a pair of spaced-apart supporting members formed integrally therewith and projecting forwardly therefrom, whereby the handle of the battery-operated device may be removably cradled in the replacement cover plate such that the respective ears are supported upon the supporting members in the charging mode of the battery-operated device. Integral struts are provided between the replacement cover plate proper and the respective supporting members. A plug on the end of the cord cooperates with the receptacle in the charging mode of the battery-operated device. A solid state charging means is within the molded plug and connected to the cord of the battery-operated device.

The invention can be seen as being a combination in a battery-operated device having a housing and further having a passive mode when the device is being charged and an active mode when the device is being discharged in use. The combination includes a relatively short electrical cord carried by the housing of the battery-operated device. A plug is provided on the end of the cord, the plug including a pair of prongs. A solid state charging means comprising an integrated circuit is disposed within the plug and adjacent to at least one of the prongs. Means are provided electrically connecting the integrated circuit between the plug and the cord. Means are provided on the battery-operated device for storing the cord in the active discharging mode of the device. Means are provided for removably supporting the battery-operated device on a wall adjacent to an electrical outlet receptacle in the passive charging mode of the device.

In another aspect the invention is a combination operatively associated with a battery-operated device having a housing. The device has a passive mode when the device is being charged and an active mode when the device is being discharged in use. The combination includes an electrical cord carried by the housing of the battery-operated device and a plug on the end of the cord, the plug including a pair of prongs. A solid state charging means comprising an integrated circuit is disposed within the plug and adjacent to at least one of the prongs. Means electrically connects the integrated circuit between the plug and the cord. Plate means is associated with means for mounting the plate means on a wall. Means are carried by the plate means for removably supporting the battery-operated device adjacent to an electrical outlet receptacle in the passive charging mode of the device.

The invention can also be seen as a combination associated with a battery-operated device having a housing. The device has a passive mode when the device is being charged and an active mode when the device is being discharged in use. The combination includes a relatively short electrical cord carried by the housing of the battery-operated device and a plug on the end of the cord. A solid state charging means is provided within the battery-operated device. Means electrically connect the solid state charging means to the cord. Means are provided on the battery-operated device for storing the cord in the active discharging mode of the device. Plate means are associated with means for mounting the plate means on a wall. Means are carried by the plate means for removably supporting the battery-operated device adjacent to an electrical outlet receptacle in the passive charging mode of the device.

The invention from another aspect can be viewed as a combination in a battery-operated device having a passive mode when the device is being charged and an active mode when the device is being discharged in use. The combination includes a plate means and means for mounting the plate means on a wall. Electrical outlet receptacle means is carried by the plate means. Means are provided on the plate means for supporting the battery-operated device on the wall. Charging means are provided within the battery-operated device. The battery-operated device includes an electrical cord connected to the charging means, and a plug on the end of the cord for cooperation with the receptacle means in the charging mode of the battery-operated device.

The invention can be viewed as an improvement in a wall support for a battery-operated device, the improvement including plug means on the device, the plug means being provided with prongs. Plate means are secured to the wall, mechanical support means being provided on the plate means for removably supporting the device on the plate means. Electrical receptacle means are operatively associated with the plate means for selective cooperation with the prongs on the plug means, the electrical receptacle means being spaced from the mechanical support means. Solid state charging means are provided in the plug means and electrically coupled to at least one of the prongs thereof.

From another aspect, the invention can be seen as being in combination in a battery-operated device which includes battery charging means and has a passive mode, when the device is being charged, and an active mode, when the device is being discharged, in use. The combination includes a plate means and means for mounting the plate means on a wall. Electrical outlet receptacle means are associated with the plate means, support means being provided on the plate means for removably supporting the battery-operated device on the wall. Coupling means are provided for coupling the charging means to the receptacle means when the battery-operated device is supported on the support means in its passive mode.

BRIEF DESCRIPTION OF THE DRAWING

FIG. 1 is a pictorial view of a battery-operated device, illustrated as a hand-held vacuum cleaning device, in its passive mode held on a support extending from a replacement cover plate positioned over an A.C. wall receptacle arrangement in accordance with a first exemplary embodiment of the present invention.

FIG. 2 is a fragmentary, pictorial view of a portion of the battery-operated device of FIG. 1 and the replacement cover plate, the device including its plug and cord, being shown at a distance from the cover plate so as to make details of the support visible.

FIG. 3 is a cross sectional view of the replacement cover plate of the type illustrated in FIGS. 1 and 2, a fragmentary portion of a battery-operated device being visible.

FIG. 3A is a side view of portion of a replacement cover plate provided with a variant of the support shown in FIGS. 1-3.

FIG. 4 is a cross sectional view of a portion of the cover plate and the battery-operated device as shown in FIG. 3, the section being taken along section line 4—4 in FIG. 3.

FIG. 5 is a view corresponding to FIG. 4, illustrating the support and battery-operated device separated from one another.

FIGS. 6 and 7 are respective side views of a portion of the battery-operated device of FIGS. 1-3, illustrating the plug thereof respectively in its unstored and stored positions.

FIGS. 8 and 9 are respectively views of portions of the battery-operated device as shown in FIG. 6 illustrating the features thereof which allow the plug and cord to be effectively and unobtrusively stored when the device is being utilized in its discharging mode.

FIG. 10 is a pictorial view of a battery-operated device, illustrated as a hand-held flashlight, in its passive mode held on a support extending from a replacement cover plate positioned over an A.C. wall receptacle arrangement in accordance with a second exemplary embodiment of the present invention.

FIG. 11 is a fragmentary, pictorial view of a portion of the battery-operated device of FIG. 10 and the replacement cover plate, the device including its plug and cord, being shown at a distance from the cover plate so as to make details of the support visible.

FIGS. 12 and 13 are respective side views of a portion of the battery-operated device of FIGS. 10 and 11, illustrating the plug thereof respectively in its stored and unstored positions.

FIG. 14 is an end view of the structure shown in FIG. 13, the view being in the direction of the arrowheads associated with section line 14—14 in FIG. 13.

FIGS. 15 and 16 are respectively front and side views of a plate and support arrangement which may substituted for the replacement plate illustrated in FIGS. 1—3 in the event one wishes to mount the plate on a wall proper rather than over an A.C. receptacle associated with wiring already present a wall in accordance with a plate arrangement which can be used in a third exemplary embodiment of the present invention.

FIGS. 17 and 18 are respectively front and side view of a plate and support arrangement which may be used in association with battery-operated devices in the event one wishes to mount the plate on a wall proper rather than over an A.C. receptacle in accordance with a plate arrangement which can be used in a fourth exemplary embodiment of the present invention.

FIGS. 19-21 are respectively a pictorial view, a cross sectional side view and an exploded pictorial view of a plate and support arrangement which may be associated with a battery-operated device in accordance with an arrangement which can be used in a fifth exemplary embodiment of the present invention.

FIGS. 22 and 23 are respectively a plan view and a side view of a power plug, its housing being shown in section to expose internal components of a battery-charging circuit therein, which can be substituted for the power plug illustrated in FIGS. 10-13 in accordance with a preferred variant of the present invention.

FIG. 24 is a pictorial view of the power plug illustrated in FIGS. 22 and 23.

FIG. 25 is a pictorial view of a power plug which may be substituted for the power plug illustrated in FIGS. 1-3 in accordance with a preferred variant of the present invention.

FIGS. 26-28 are respective cross sectional views of the power plug illustrated in FIG. 25, the sections being taken through the housing of the plug, to expose internal components of a battery charging circuit therein.

DESCRIPTION OF THE PREFERRED EMBODIMENTS

Figure 29:
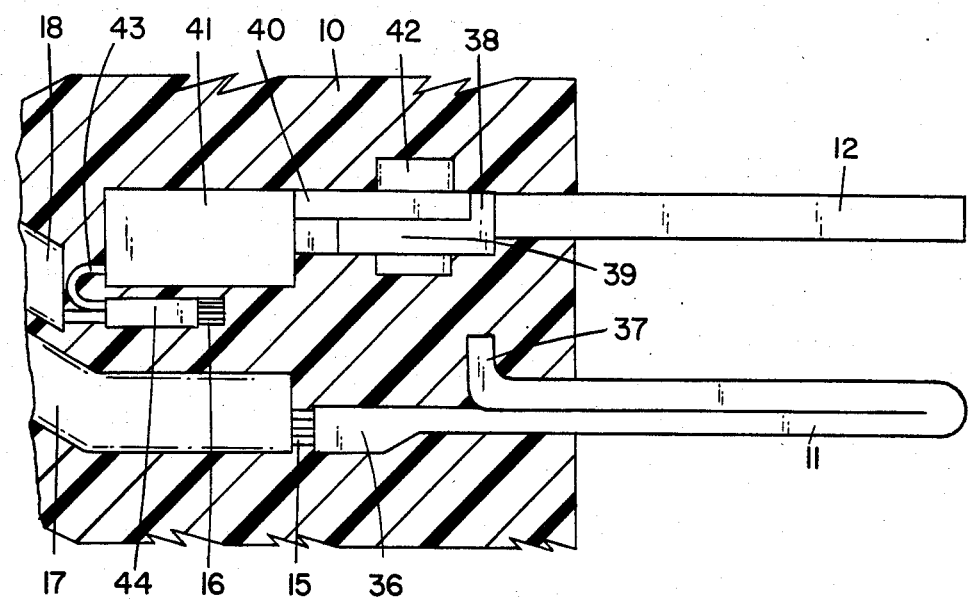
FIG. 29 is a side view of a variant of the combination of a prong, solid state circuit and a heat sink, as well as portions of a circuit connections within a power plug having which may be substitute for the plugs illustrated in FIGS. 22-24 and in FIGS. 25-28 and which may be substituted for corresponding components in accordance with preferred embodiments of the present invention.

A first exemplary embodiment of the present invention in a battery-operated device having a passive and an active mode is illustrated in FIGS. 1-9 operatively supported on a wall, a fragmentary view of which has been generally designated by the numeral 60. A plate 61, illustrated as a replacement cover plate for a pair of A.C. wall receptacles 62, 63, the wall receptacles 62, 63 being carried by a conventional A.C. outlet box 64 which is shown has being recessed into the wall 60 (FIG. 3). The replacement cover plate 61 is removably fixed to the A.C. outlet box 64 by a threaded bolt 65 which holds the replacement cover plate 61 to the outlet box 64 in the same manner as a conventional cover plate is held to such boxes. As shown, the outlet box 64 is fixed to the wall 60 by a pair of bolts 66, 67 which extend through respective apertures in the wall 60 and engaged respectively bolts 68, 69. As thus far described, the replacement cover plate 61 is not unlike a conventional cover plate.

The cover plate of 61 differs from a conventional cover plate in as much as it is elongated vertically in the downward direction and carries near its bottom edge a support 70, illustrated as being integral with the cover plate 61 and which, like the cover plate 61 and conventional cover plates is made of a plastics material. The support 70 includes spaced-apart flat, top and bottom tab portions 71, 72. Midway in space between the tab portions 71 and 72 and near opposite side edges of the support 70 are a pair of spaced-apart fingers 73 and 74. The upper surface of tab portion 71, the lower surface of the tab portion 72 and the respective fingers 73, 74 are operatively designed to support a battery-operated device, shown for purpose illustration as a hand-holdable vacuum cleaning appliance 75. The fingers 73,74 are sufficiently resilient that they may be depressed inwardly in response to gentle forces when one wishes to place the appliance 75 on or to remove it from the support 70.

The hand-holdable vacuum cleaning appliance 75 includes a handle portion 76 designed to be grasped by a user's hand. Extending from the handle 76 and integral therewith is a housing 77 within which a battery pack, which can be recharged, is positioned and operatively arranged to supply D.C. current to a small electric motor which is also housed within the housing 77 and arranged to drive a vacuum-producing fan-like member which draws dust, dirt and the like thru an elongated slot opening in the distal end of a housing 78 removably fixed to the housing 77 by conventional mechanical means which are releasable by depressing a button 79. The depressable button 79 allows the user to release the dust-collector containing housing 78 from the housing 77 so as to replace or empty a dust container which is positioned within the housing 78 to collect the materials drawn into the housing 78 during use. The air which is drawn into the distal end of the dust-collector containing housing 78 exits via a plurality of apertures which are defined by the peripheral portion of a member 80 and the baffle-like members 81 which extend downwardly from the lower end of the housing 77 to the member 80, which also supports the vacuum producing fan-like member.

Extending upwardly from an end of the handle 76 is a flexible power cord contained within a flexible stress relief 83, the cord having a pair of leads therein which extend into a power plug 82 which is integral with the stress relief 83, is fixed to the cord with the stress relief 83 and includes a pair of prongs 84, 85 engagable in cooperating female connectors in an A.C. outlet 63. In preferred embodiments a solid state rectifying circuit, preferly a D.C. pulse producing circuit, is fixed within the power plug 82 and operatively arranged to supply D.C. current pulses to the battery or battery pack within the housing 77 when the appliance is in its passive mode and being recharged, the power being supplied via the leads within the power cord. The upper surface of the end of the handle 76 from which the power cord and flexible stress relief 83 extend is provided with a groove 85 which extends downwardly from that portion thereof which is visible in FIG. 1, as best illustrated in FIG. 8 and in FIG. 9, the width of the groove 85 corresponding to the width of the stress relief 83 so that the stress relief 83 can rest in the groove 85 when the power cord is moved from the position illustrated in FIG. 6 into the position illustrated in FIG. 7. The groove 85 joins a groove 86 provided in an under surface in a portion of the handle 76, the groove 86 extending transversely to the groove 85 (FIG. 8) and thereby defining a surface which can address an end of the power plug 82 when it is in its stored position (FIG. 7), the width and latitudinal extent of the groove 86 corresponding to that flat surface of the power plug 82 which, when the power plug is arranged for charging the battery or batteries in the battery-operated device 75, is positioned on a surface of the replaceable wall plate 61.

As visible in FIG. 8, a recess 87 is provided into the housing 76 from the bottom surface of the groove 86, this recess 87 having a width corresponding somewhat to the distance between the outer most major surfaces of the prongs 84, 85 so that the resilient prongs may be received within the recess 87 and be subject to forces which removably fix the prongs 84, 85 in the recess 87 when the power plug 82 and its associated cord and stress relief 83 are in the stored position illustrated in FIG. 7, this position being the position which the power plug 82 and its associated cord would be placed when the battery-operated device was being used in its discharged mode. As shown in FIG. 6 the power plug 82 and its associated cord and stress relief 83 are shown in a position in which these members would be placed as one prepares to plug the power plug 82 into a A.C. receptacle, such as the receptacle 83. It is to be understood that as illustrated in FIG. 7 the stress relief 83 is not positioned entirely within the groove 85, its length having been somewhat exaggerated to show the cord and stress relief 83.

A portion of the support 70 (FIGS. 1-3) is illustrated in each of FIGS. 4 and 5 which show portions of the support 70 in cross section respectively in engagment with and out of engagment with a portion of the handle 76 with which the support 70 cooperates to removably fix the battery-operated device 75 to the plate 61. When a user wishes to support the battery-operated device 75 in the vicinity of an A.C. receptacle an especially shaped recess which is molded in the underside of the handle 76 is juxtapositioned with the support 70 which extends from the cover plate 61 fixed to the wall 60. The support 70 includes, as visible in FIGS. 4 and 5 the tab portion 72 which is vertically spaced from the other tab portion 71 (FIG. 2) of the support 70. The respective resilient fingers 73, 74 which are positioned between the tab portions 71, 72 are of a resilient nature, because of their size, and have respective shaped end portions 88, 89 which extend outwardly in opposite horizontal directions from the fingers 73, 74 proper. The void in the portion of the handle 76 visible in FIGS. 4 and 5 includes a lower most horizontal extending surface 90, as well as a corresponding parallel upper horizontal surface spaced therefrom (not visible in FIGS. 4 and 5), this void being further defined by two side wall defining portions 91, 92 of the handle 76 having respectively especially developed end portions 93, 94 which have inwardly facing surfaces which compliment the outwardly facing surfaces of the end portions 88, 89 of the resilient fingers 73, 74. Thus, when the battery-operated device 76 is positioned with its handle 76 opposite the support 70, a gentle pressure applied by the user will cause the resilient fingers 73, 74 to be bent inwardly and snap into place with their respective end portion 88, 89 positioned against complimenting surfaces defined by the end portions 93, 94 of the side wall defining portion 91, 92 of the void in the handle 76, the downward-more major surface of the tab portion 72 being juxtapositioned over the surface 90 formed within the void in the handle portion 76. Its to be understood that the surface (not visible in FIGS. 4 and 5) which is parallel to the surface 90 within the void in the handle 76 addresses the upper surface of the tab portion 71 (not visible in FIGS. 4 and 5).

In a preferred variant of the first embodiment, the support 70 (FIG. 2) could be replaced with a similar support 70' shown in FIG. 3A extending from a bottom portion of a replacement cover plate 61' fixed to a wall 60. The support 70' includes an upper tab portion 71', a spaced apart lower tab portion 72' and a pair of resilient fingers, only one finger 74' being visible. The support 70', with its tab portions 71', 72' and fingers, only finger 74' being visible, is inclined upwardly. The void in a battery-operated device which is to be supported by the support 70' would have to be shaped to complement the support 70'.

A second illustrative embodiment of the invention in the battery-operated device which has a passive mode when it is being charged and an active mode when it is being used is illustrated in FIGS. 10-14 to which reference is made. A support is developed as an integral portion of a replacement cover plate 95 which is to be positioned over a pair of A.C. wall receptacles 96, 97 which, like the embodiment illustrated in FIGS. 1-3, are provided in a conventional recessed A.C. junction box (not illustrated in FIGS. 10-14). The replacement cover plate 95 is held by a threaded bolt 98 to the junction box and is positioned over the A.C. receptacles 96, 97 so that apertures in the replacement cover plate 95 expose and provide access to the receptacles. As thus far described the replacement cover plate 95 is of conventional construction and similar to a conventional cover plate.

The illustrated replacement cover plate 95 differs from a conventional cover plate by having a greater vertical extent. Extending along the approximately lower half of the cover plate, adjacent respected side edges thereof and integral with cover plate 95 proper are a pair of struts 99, 100 which support a pair of spaced-apart supporting members 101, 102 formed integrally therewith and projecting forward from the major exposed surface of the cover plate 95. The supporting member 101, 102 are joined together by a strengthing rib 103 which is also integral with the cover plate 95 and extends between the supporting members 101 and 102.

A pair of grooves 104, 105 are formed on the distal portion of the respective upper surfaces of the supporting members 101, 102, these grooves having upward facing arcuate surfaces.

A battery-operated portable device, illustrated as a flashlight 106, can be removablly positioned so as to be supported by the supporting members 101, 102 on the arcuate surfaces of the grooves 104, 105.

The flashlight 106 housing includes a handle portion 107 and a lamp-containing portion 108 formed integrally with the handle portion 107. A battery or batteries for operating the flashlight 106 are positioned within the handle portion 107 in a conventional manner. An end surface 109 of the flashlight 106 has a short upstanding post 110 formed integrally therewith. A flexible power cord within a flexible stress relief 111 extends outwardly from an end of the post 110 and has provided on an end thereof a power plug 112 which is to be plugged into and A.C. receptacle, such as a receptacle 97. The power plug 112 and the stress relief 111 are integral. A pair of leads extend from the power plug 112 within the stress relief 111 and into the post 110 and thence to circuitry within the housing 107 for effecting the charging of the battery or batteries positioned therein. The leads within the power cord carry D.C. current pulses which are supplied from a solid state circuit, preferably an integrated circuit, which is provided within the plug 112 and can be molded into place when the plug 112 is formed. Extending downwardly from opposite sides portions of the housing 107 are respective ears 115, 116 each provided with a respective arcuate surface at their bottom most extents, these downwardly facing arcuate surfaces corresponding to the upwardly facing arcuate surfaces defined by the grooves 104, 105 provided in the support members 101, 102 so that the flashlight can be removably positioned on the support and be supported on the arcuate surfaces in the bottom of the grooves 104, 105. A recess or aperture 117 is provided in a portion of the end surface 109 of the housing handle 107 and positioned, with respect to the power plug 112 so that prongs 113, 114 associated with the power plug 12 can be positioned within the recess or aperture 117, which is so dimensioned that its short side surfaces bear against opposing outwardly facing side surfaces of the prongs 113, 114 and thus hold the plug 112 firmly in position (FIG. 12) when a user wants to use the flashlight in its active mode. When a user wishes to recharge the battery or batteries within the handle 107, the user simply pulls, with a gentle force, on the plug 112 so as to remove it from its position shown in FIG. 12 to the position shown in FIG. 13 and thereafter insert the prongs 113, 114 into an A.C. receptacle, such as the receptacle 97, resting the arcuate, downwardly facing surfaces provided on the respective ears 115, 116 so as to position these surfaces against the corresponding upwardly facing arcuate surfaces in the respective grooves 104, 105.

The two embodiments illustrated in FIGS. 1-14 have been disclosed as being associated with replacement cover plates for conventional A.C. receptacles in recessed wall-mounted junction boxes. In some installations, insulation and convenient positioning of the support and its associated battery-operated device may be at places other then those at which wall-mounted A.C. receptacles are in place. In still others, no wiring may be provided within a wall or it may be too distant for easy access.

A third embodiment of a plate arrangement for a supporting a battery-operated device in its passive charging mode is illustrated in FIGS. 15 and 16 which show respectively a front and side view of a substantial rectangular plate 117 having conventional beveled edges much like conventional cover plates, the plate 117 being positioned on a wall 118, illustrated as a fragment thereof in cross section. The plate 117 is fixed to the wall 118 by three fastening devices, heads of three lag bolts 119-121 or the like being visible in FIG. 15. A support 70, which corresponds to the support 70 illustrated in FIGS. 1-3, is shown extending outwardly from a major face of the plate 117 and is integral therewith. Like the support 70 illustrated in FIGS. 1-3, the support 70 of FIGS. 15 and 16 is constituted by an extension integral with the plate 117 and includes a top tab portion 71, a bottom tab portion 72 and a pair of fingers 73, 74 which can be pressed inwardly so as to engage cooperating surfaces in a recess within the battery-operated device, such as the battery-operated vacuum cleaning appliance 75 (FIGS. 1-3) which is to be supported thereby. Positioned above the support 70 and extending outwardly from the major surface of the plate 117 is a substantially rectangular, box-like housing 122. The front surface of the housing 122 is provided with two respective pairs of apertures 123, 124 and 125, 126 which are so dimensioned and spaced that they are suitable for receiving a pair of prongs from a conventional power plug. Operatively arranged within the housing 122 are suitable A.C. receptacles which are conductively connected to a pair of upstanding prongs (not visible) which may be plugged into a corresponding female connector of an extension cord, such as a connector 127 illustrated with a portion of its associated extension cord 128 extending therefrom. It is to be appreciated that a variant of the embodiment illustrated in FIGS. 15 and 16 could be provided in which the connector 127 and extension cord 128 would be replaced with a power cord which is permanently fixed to the housing 122 by an integral boss so as to supply A.C. power to the A.C. receptacles housed within the housing 122, the internal connections of which correspond to those of a multiple-outlet extension cord.

It is to be understood that the support 70, shown in FIGS. 15, 16 could be replaced with a support composed of struts, supporting members with an associated arcuate-surface defining grooves, corresponding substantially to the struts 99, 100, the support members 101, 102 with their associated grooves 104 and 105 if one wishes to support the battery-operated device having a construction like or similar to the flashlight 106 of FIG. 10. The support could be constructed as support 70' illustrated in FIG. 3A.

As illustrated in FIGS. 17 and 19, a further embodiment of a plate and support arrangement, which can be used in association with a battery-operated device and which can be positioned on a wall 128, includes a flat, rectangular plate 129 having extending downwardly and outwardly from its lower central portion, an integral support which includes a hook defined by a downwardly extending extension 139 and an outwardly extending end 140. The support is provided with two pair of spaced-apart apertures 130, 131 and 132, 133 into which prongs of conventional power plugs may be inserted. The flat plate 129 has a boss extending from its upper edge and integral therewith from which a power cord 141 extends, a power plug being provided on its end. Electrical connectors are provided within the plate and support to supply A.C. power from the cord 141 to prongs which are to be plugged into the pairs of apertures 130, 131 and 132, 133. Four apertures are provided in the plate 129 in the vicinity of its corners, four screws, bolts or the like, respective heads 134-137 thereof being visible are provided for holding the combined plate and support on a wall. When not being used as a support and disconnected from a wall, the plate, cord and plug can be used as a floor-engaging multiple outlet extension cord. The embodiment illustrated in FIGS. 15, 16 also can be removed from the wall and function as a floor-engaging multiple outlet extension cord.

An additional embodiment of a plate having an integral support for a battery-operated device, on which it may be placed in its passive mode so that the battery or batteries therein may be recharged is illustrated in FIGS. 19-21 as including a combined plate and support 143. The combined plate and support 143 is composed of a first substantially flat, square, member 144 of molded plastics material and a further single piece member 145 which is provided in its rear surface with an indentation 146 having a vertical and horizontal extent which corresponds to those of the member 145. When assembled, the member 145 is positioned in the indentation 146 and conventionally fixed to the member 145 using ultrasonic welding or another conventional technique. The member 145 is constituted by a single piece of molded plastics material and includes protruding from its frontal surface a first rectangularly shaped box-like protrusion 147 extending from its central portion and a second rectangularly shaped, box-like protrusion 148 which extends outwardly from the major exposed surface of the member 145 beneath and spaced from the protrusion 147. The protrusion 148 is somewhat longer than the protrusion 147, extending further from the member 145 proper. The protrusions 147 and 148 are hollow. The protrusion 147 has a pair of rectangular apertures 149, 150 in its outermost surface, these apertures 149, 150 being shaped and spaced apart so as to be able to receive the male prongs of a power plug having a pair of prongs extending therefrom of the type ordinarily adapted for insertion into conventional A.C. receptacles. The member 144 and the member 145 are provided with aligned apertures 151, 152 through which screws, bolts or lag bolts can extend so as to position the assembled combined plate and support 143 on a wall or the like, a third aperture 153 being provided beneath the protrusion 148 so as to receive a third screw, bolt or lag bolts to further fix the combined plate and support 143 to a wall.

As best seen in FIG. 21, an exploded view of the combined plate and support 143, a pair of electrically conductive members 154, 155 are provided. The conductive members 154, 155, which may be stamped out of an appropriate single piece of sheet metal, includes a pair of bent, elongated prongs 156, 157 extending from side portions of the members 154, 155 and being bent inwardly. Two pair of additional electrically conductive prongs 158, 159 and 160, 161 extend from respective opposite sides of the conductive members 154, 155, each of these pairs of prongs being firstly bent outwardly and then bent inwardly to define respective spaced apart parallel portions 162, 163 and similar portions (not visible) constituting portions of the member 155. When assembled, the flat member 144 holds the conductive members 154, 155 in position with respect to a pair of rectangular apertures 164,165 extending through the narrow portion of the member 145, as best seen in FIG. 19, near its top. When the prongs 156, 157 are positioned through the apertures 164, 165, the spaced-apart parallel surfaces defined by the end portions 162, 163 as well as corresponding end portions associated with the bent members 158, 159 within the protrusion 147 are in alignment with the pair of rectangular apertures 149, 150 in the protrusion 147.

If one wishes to provide for A.C. voltage to the conductive members 154, 159 and thence to male prongs of a power cord which may be inserted into the respective apertures 149, 150, the female connector at one end of a conventional extension cord may be positioned over the prongs 156, 157 thereby providing A.C. power to the conductive members 154, 155. The assembled plate and support 143 is attachable to a wall by screws, bolts, lag bolts or the like, which would extend through the respective apertures 151–153, one threaded bolt 166 being shown in FIG. 21 aligned with the aperture 152. While a more or less rectangular box-shaped protrusion 148 is illustrated in FIGS. 19–21, as the support for a battery-operated device, it is to be appreciated that any of the other supports shown herein, such as those shown in FIGS. 1–9 and in FIGS. 10–14 could be provided as well, the supports being elongated or spaced vertically from the protrusion 147 in these instances to place the support itself and the battery-operated device which is to be supported thereon at a sufficient distance from the protrusion 147 so that the power plug of the battery-operated device could be inserted into the prong-receiving rectangular apertures 149, 150.

FIGS. 22, 23 and 24 are respectively a plan view, a side view and a pictorial view of a power plug, which may be substituted for the power plug 112 shown in FIGS. 10–13. The substitutable power plug includes a molded plastic housing 167, illustrated in cross section for the purpose of simplicity and to expose circuit and connective components therein which are fixed therein during conventional injection molding of the housing 167. The power plug is provided at one end of the housing 167 with a pair of prongs 168, 169 which are adapted to be inserted into a conventional A.C. power receptacle (not shown), such as a conventional wall outlet having a special replacement cover plate or a wall-mounted plate which may be connected to external wiring or a conventional extension cord or the like as noted above. At the other end of the housing 167 and extending therefrom are a pair of insulated leads 170, 171 which include respective bundles of conductive wires 172, 173 surrounded respectively by respective electrically insulating sheaths 174, 175. The respective electrical conductors defined by the respective bundles with the conductive wires 172, 173 supply D.C. power to a battery pack, battery or D.C. powered device, such as those mentioned in the introductory portion of the specification and illustrated in the various figures of drawings. The pair of prongs 168, 169 extend outwardly from the housing 167. The insulated leads 170, 171, the housing 167 and the prongs 168, 169 have the general appearance of a conventional power plug. The outer surface of the housing 167 is provided with a plurality of spaced apart fins 177, which fins serve two purposes. Firstly, the fins 177 provide a gripping arrangement by which a user may grasp the housing 167 to insert or remove the prongs 168, 169 from an A.C. receptacle. Additionally, the fins 177 provide a surface area for radiating heat which may be generated by the solid state circuit which produces D.C. current pulses and is encapsulated within a housing 178 of plastic material, the housing 178 having an extension 179 of a heat sink therein which is in thermal communication with the solid state circuit and serves to transfer heat therefrom into the plug housing 167 and thence to the atmosphere. Additionally, a plurality of metallic members, three such members 180–183 being shown by way of example, are in contact with internal circuit components molded within the plug, which metallic members serve two purposes. Firstly, they position the circuit components within a mold during manufacture when the housing 167 is to be injection molded about the circuit components. Secondly, the metallic members 180–183, once molded in place with the circuit components aid in the transfer of heat from the circuit components to surface portions of the housing 167. The prongs 168, 169 which as a matter of convenience, correspond to conventional prongs ordinarily used in A.C. receptacle engaging plugs are illustrated as being folded metallic members which include within the housing 167 respective enlarged upstanding end portion 183, 186 which define crimpable, conductive members. The free end of the bundle of conductive wires 172 which are housed within the insulating sheaths 174, is positioned within the end portion 183 which thereafter is crimped to fix the conductive wires 172 in place.

In order to make the prong 168 more secure against axial forces which may occur when the user pulls the housing 167 from its associated A.C. receptacle, the prong 168 is provided with a bent, short, right-angle extension 184. The prong 169 is shown having a bent portion 185 which is positioned within the plug housing 167 more or less in the same plane as the extension 184 of the prong 168. The upstanding end portion 186 of the prong 169 is crimped about a metallic conductor 187. The metallic conductor 187 is in electrical contact with a solid state circuit component within an encapsulating housing 178 and desirably is large enough that it too, aids in transferring heat from the solid state circuit within the housing 178 into the plug housing 167 and to the prong 169. A second electrically conductive member 188, which is shaped like the conductive member 187, extends outwardly from the encapsulating housing 178 of plastics material, the conductive member 188 being bent about an angle of 180° so that a thin portion thereof extends into a conductive cylindrical, crimpable connector 189 which also receives the bundle of wires 173 from the lead 171. Before the housing 167 is molded about the circuit components, the crimpable cylindrical connector 189 is crimped so as to connect an output from the solid state circuit within the encapsulating housing 178 of plastics material to the bundle of wires 173 so that D.C. current pulses produced by the solid state charing circuit can be applied to the battery or batteries within a battery-operated device with which the plug illustrated in FIGS. 22–24 is associated.

In accordance with known techniques, a portion of the molded housing 167 is developed as outwardly extending members which constitute a stress relief 190 and which also lend support to the sheaths 174, 175, while providing some flexibility to the power cord connected between the plug, which includes the housing 167, and the battery-operated device which is to have its battery or batteries recharged by current pulses produced by the circuit housed within the encapsulating housing 189 within the housing 167.

A power plug, which can be substituted for the power plug 82 in the embodiment illustrated in FIGS.

1-3, is illustrated in FIGS. 25-28 as including a housing 191 of molded plastics material. A plurality of fins 192 extend outwardly from a major back surface of the housing 191 for the purpose of allowing heat which is generated by a solid state circuit within the housing 191 to be dissipated into the atmosphere.

A pair of finger-engagable tabs 193, 194 are provided on opposite side surfaces of the housing 191, these tabs serving as convenient members which may be grasped by one who wishes to insert or to remove a pair of prongs 195, 196 which extend from a front flat surface of the housing 191, from an A.C. wall receptacle or the like. The tabs 193 and 194 also serve as heat dissipators, much like the plurality of fins 192.

A necked-down portion 197 extends from the power plug proper and terminates in a stress relief 198 which is molded integrally with the housing 191, the fins 192, the tabs 193 and the necked-down portion 197. A pair of insulating sheaths 199, 200 are positioned within the stress relief 198 and surround respectively bundles of conductive wires 201, 202. The bundle of conductive wires 202 within the insulating sheath 200 extends within the plug housing 191, the ends thereof being positioned within a conductive, crimpable metallic cylindrical connector 203. Also extending into the cylindrical connector 203 from its opposite end is a conductor 204 which extends from the solid state circuit, preferably a monolithic D.C. current pulse producing integrated circuit, which is housed within an encapsulating housing 205 which is positioned adjacent the cylindrical connector 203. The connector 204 constitutes an output circuit connection from the solid state circuit which is encapsulated within the housing 204. The solid state circuit includes a heat sink, an extension 206 of which extends outwardly from the encapsulating housing 205 so as to transfer heat into portions of the housing 191. Portions of the prongs 195, 196 which are molded in place within the housing 191 include respective up-standing crimpable connectors 207, 208 which are connected respectively to a conductor 209, which constitutes an input connection to the solid state circuit encapsulated within the housing 205, and the bundle of wires 201. A plurality of metallic members are arranged within the housing 191, three such members 210-212 being shown for purposes of illustration, contact components within the housing 191. These metallic members serve two purposes; firstly, they are utilized to hold the components in place while the housing 191 is molded about the components housed therein. Secondly, these metallic members aid in the transfer of heat from the components to surfaces of the plug housing 191 and thus aid in dissipating heat from the solid state circuit.

FIG. 29 is a plan view of a power plug, which may be in FIGS. 1-3 and 10-13, including a substituted for those shown molded plastic housing 10, illustrated as a fragment for purpose of simplicity, incorporating a preferred embodiment of a battery-charging circuit. The power plug is provided at one end of the housing 10 with a pair of prongs 11, 12 extending outwardly from a flat surface 19 and which are adapted to be inserted into a conventional, A.C. power respectacle (not shown), such as a conventional wall outlet having a special replacement cover plate or the like as noted above. At the other end (not shown) of the housing 10, and also extending therefrom, are a pair of insulated leads which include respective bundles of conductive wires 15, 16, surrounded respectively by respective electrically insulation sheaths 17, 18, the sheaths are to extend outwardly from the housing 10. The respective electrical conductors defined by the respective bundles of conductive wires 15, 16 may supply D.C. power to a battery pack, battery or D.C. powered device such as those mentioned in the introduction proportion of the present specification.

The pair of prongs 11, 12 extend outwardly from the housing 10, the configuration of the housing 10 with its associated pair of prongs 11, 12 and insulated leads having the general appearance of a plug of the type illustrated for example in FIGS. 22-24. The insulated leads do not carry A.C. current, but rather are leads for supplying D.C. current to a battery-operated portable device, appliance, tool, flashlight, vacuum cleaner, television set, radio, recorder, soldering pencil, shaver, telephone, calculator, computer, or the like. It is to be appreciated that the housing 10 may in various realizations of the present invention, be of diverse construction. For the purpose of illustration, the housing 10 is illustrated as being a molded plastic housing.

The prong 11, which as a matter of convenience can be any conventional prong ordinarily used in A.C. receptacle-engaging plugs, is illustrated as being a folded metallic member which includes within the housing 10 an enlarged, up-standing portion 36 which defines a crimpable, conductive member into which the free end of the bundle of conductive wires 15, which are housed within the insulating sheath 17, can be positioned and the portion 36 thereafter crimped to fix the wires 15 in place. In order to provide a surface area to make the prong 11 more secure against axial forces which might occur when a user pulls the housing 10 from its associated A.C. receptacle, the prong 11 is provided with a shorter, right angle extension of 37. As thus far described, the housing 10 is of conventional construction, the housing 10 per se, being formed by molding plastic material about the members, and portions thereof, illustrated as being within the housing 10. It is to be understood that other types of housings can be used as well; a premolded, two-piece, clam-shell type housing could be used.

As illustrated in FIG. 29 the prong 12 is shown as having a bent portion 38 which is positioned with plug 10 more or less in the same plane as the extension 37 of the prong 11. The bent portion 38 is defined by a pair of 90-degree bends in the prong 12, the more inwardly one of the bends providing an extension portion 39 of the prong 12 which has an aperture (not visible) extending therethrough and which is aligned with a aperture in an extension 40 of a heat sink member which is encapsulated, with its associated solid state circuit which produces D.C. current pulses, within a plastic housing 41, its lower-more surface being free of the plastic material. The solid state circuit which is within the housing 41 and which produces direct current pulses can be of the type disclosed in the U.S. Pat. No. 3,943,423 to Phillip A. Hoffman entitled "Battery-Charging Circuit" issued Mar. 9, 1976 and those disclosed in U.S. patent application Ser. Nos. 472,758 and 524,356 and 524,357 of Phillip A. Hoffman filed respectively on Mar. 7, 1983 and Aug. 18, 1983, the disclosure of which are incorporated herein by reference. The extension 40 of the heat sink member, as illustrated in FIG. 29 is thermally and electrically conductively connected to the extension portion 39 of the prong 12 by a rivet 42 which extends through the apertures in the extension 40 of the heat sink and the portion 39 of the prong 12. It is to be appreciated that the extension 40 and the portion 39 of the prong 12 could be soldered together, rather than being fixed by a rivet thereby providing both thermal and electrical connections, to the heat sink member which includes the extension 40. At the other end of the encapsulating plastic housing 41, a conductive member 43 extends, providing an output from the solid state circuit within the housing 41. As illustrated, the electrically conductive member 43 is bent about an angle of 180°, its free end being spaced inwardly from portion extending parallel to the prong 12. A conventional, cylindrical crimpable member 44 is provided within the housing 10 to receive the ends of the bundle of wires 16 and the conductive member 43. In its final disposition, of course, the member 44 is crimped to provide electrical communication between the electrically conductive member 43 and the bundle of wires 16. The connection between the inwardly spaced portion of 39 of the prong 12 and the extension 40 of the heat sink member provides both electrical and thermal contact with a heat sink member within the plastic housing 41. In the illustrated case, where the heat sink member extension 40 provides both electrical and thermal communication, it is to be appreciated that, in some instances, it may be necessary to provide separate electrical and thermal current paths to the solid state circuit within the housing 41. To achieve such separate paths, an upper surface of the solid state circuit within the encapsulating housing 41 could be in part provided with an insulating layer, such as silicon dioxide, or a separate insulator, with a conductive connection or connections being provided to the extension 40, via an opening or openings through the insulating layer; the openings could be provided during manufacture by conventional etching steps or the like. It is to be appreciated that other embodiments and variants in which a separate thermal and electrical connection must be provided are also suitable. Moreover, still other embodiments are possible in which the heat sink member within the encapsulating housing 41 is integral with the prong for purposes of providing both thermal and electrical communication with the prong 12 and still others in which electrical and thermal paths differ, but good and efficient thermal communication is nevertheless provided so the heat can be dissipated through the prong 12.

Figure 30:
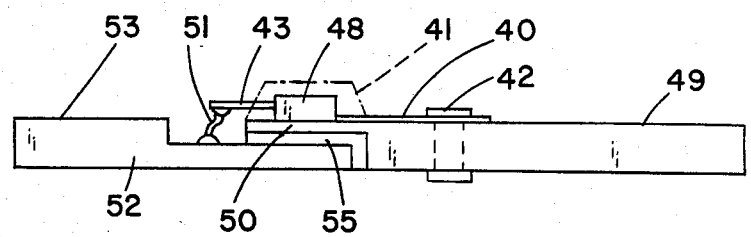
FIG. 30 is a side view of a variant of the combination of a prong, solid state circuit and heat sink of those portions of the plug as illustrated in FIGS. 29 and which may be substituted for the corresponding components shown therein in accordance with further preferred embodiments of the present invention.

FIG. 30 illustrates a preferred embodiment of circuit members, the components shown therein being intended to replace certain components in the structure illustrated in FIG. 29 and correspondingly components within the power plugs shown in the various other figures. As illustrated in FIG. 29, an elongated prong 49, which replaces the prong 12 in the embodiment illustrated in FIG. 28, includes a portion 50, which has a narrower extent than that portion of the prong 49 which is to fit into a corresponding female connection in an A.C. receptacle. A solid state circuit, illustrated generally by the numberal 48, is positioned within a plastic encapsulating housing 41, shown in phantom. A heat sink is provided within the encapsulating plastic housing 41 and includes an extension 40 against which a surface of the elongated extension 50 of the prong 49 is positioned, as well as additional surface area in the same plane. The extension 40 of the heat sink within the encapsulating housing 41 is provided with an aperture which is aligned with a further aperture in the prong 49, a rivet 42 being provided to fix the extension 40 to the prong 49. The housing 41 is shown in phantom so that the position of the solid state circuit shown generally by the numberal 48 can be better visualized and seen. A conductive member 43 extends from the solid state circuit 48, a conductive connection 51 being provided between the conductive member 43 and connector 52. The conductive member 51 is illustrated as being a wire soldered between the connector 52 and the conductive member 43. The connector 52 includes a pair of upstanding side members, one side member 53 being visible, between which wires, such as a bundle of wires 16 shown in FIG. 29, may be inserted and the side members 53 clamped or crimped over the bundle of wires to provide an electrical outlet connection for the conductive member 43 from the solid state circuit 48. The electrical connector 52 thus replaces the cylindrical crimpable member 44 utilized in the embodiment illustrated in FIG. 29. An insulating member 55 extends between the electrical connector 52 and the prong 49 so as to electrically insulate the input and output connections to the solid state circuit 48. It is to be understood that the extension 40 of the heat sink can be soldered to the prong 49, rather than it be connected thereto by the rivet 42, as shown. The embodiment illustrated in FIG. 30 is arranged so that both electrical and thermal connections to the solid state circuit 48 are provided via the extension 40 of the heat sink member.

It is to be understood that the prong 49 and the electrical connector 52, as well as the components there between, are to replace the prong 12 and the cylindrical conductive crimpable member 44, as well as the components there between, in the embodiment illustrated in FIG. 29.

Figure 31:
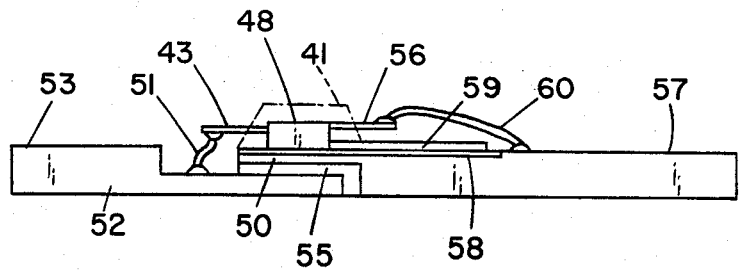
FIG. 31 is a side view of a further variant of the prong, solid state circuit and heat sink of those portions of the plug shown in FIG. 29 and which may be substituted for the corresponding components shown therein in accordance with other preferred embodiments of the present invention.

Referring to FIG. 31, a further embodiment of circuit members is seen, this embodiment being similar in may respects to the embodiment illustrated in FIG. 30 where similar reference numerals designate similar components. The embodiment in FIG. 31 differs from that of FIG. 30 in as much s the elongated prong 49 (FIG. 30) has been replaced by a similar elongated prong 57 which includes an extension thereof 50 which is positioned beneath the solid state circuit 48. In this instance, however, the elongated prong 57 is electrically insulated form the solid state circuit 48 by an electrically insulating member 58 which is illustrated as being positioned between the extension 50 of the prong 57 and the solid state circuit 48 and its associated heat sink extension 59, which replaces the extension 40 shown in FIG. 30. The insulating member 58 is shown as being recessed into a surface of the prong 57, but could be positioned on its upper surface. In order to provide an electrical connection between the prong 57 and the solid state circuit 48, a conductive member 56 extending from the solid state circuit 48 is provided, this electrically conductive member 56 is conductively connected to the elongated prong 57 via a conductive wire 60 which is soldered between the prong 57 and the conductive member 56. Thus, while the elongated prong 57 and heat sink extension 59 provide good thermal conductively from the solid state circuit, electrical connection is provided from the prong 57 via the conductive member 56 and the conductive wire 60, which is soldered there between. As in the case of the embodiment illustrated in FIG. 30, the elongated prong 57 and the electrical connector 52, as well as the components shown there between, replace the prong 12 and the cylindrical crimpable member 44, as well as the components there between, shown in FIG. 29.

The embodiment illustrated in FIG. 31 has the same output connection arrangement from the solid state circuit 48 as the arrangement shown in FIG. 30, these being constitutes by the crimpable connector 52, with its side members 53, the soldered wire 51 and the conductive member 43. The prong 57 is electrically insulated from the connector 52 by electrically insulating member 55.

It is to be understood that the foregoing description, when taken with the accompanied drawing figures, relates to preferred embodiments and variants which are set out in the way of illustration, not by way of limitation. Numerous other embodiments and variants are also possible without departing from the spirit and scope of the present invention, its scope being defined by the appended claims.

What is claimed is:

1. In a battery-operated device having a passive mode when the device is being charged and an active mode when the device is being discharged in use, the combination of a plate means, means for mounting the plate means on a wall, electrical outlet receptacle means associated with the plate means, means on the plate means for removably supporting the battery-operated device on the wall, charging means including a heat-producing solid state charger within the battery-operated device, the battery-operated device including an electrical cord connected to the charging means, and a plug on the end of the cord and having a pair of metal prongs for cooperation with the receptacle means in the charging mode of the battery-operated device, said solid state charger being within said plug and having heat sink means in effective thermal communication with at least one of said prongs for transferring and dissipating heat produced by the solid state charger.

2. The combination of claim 1, wherein the plate means comprises a replacement cover plate for a wall-mounted electrical outlet receptacle.

3. The combination of claim 1, wherein the plate means includes an upstanding boss for trapping a conventional extension cord against the wall, the upstanding boss having access means for at least one receptacle on the extension cord.

4. The combination of claim 2, further including means on the battery-operated device for storing the cord when the battery-operated device is in use in its discharging mode.

5. The combination of claim 1, wherein the solid state charger comprises an integrated circuit.

6. The combination of claim 5, wherein the integrated circuit is integrally within the plug.

7. The combination of claim 5, wherein the plug is molded about the integrated circuit and constitutes a housing therefor.

8. The combination of claim 5, wherein the integrated circuit is disposed adjacent to one of the metal prongs within the plug.

9. The combination of claim 1, wherein the plug is molded about the solid state charger and constitutes a housing therefor.

10. In a battery-operated device having a passive mode when the device is being charged and an active mode when the device is being discharged in use, the combination of a plate means, means for mounting the plate means on a wall, electrical outlet receptacle means associated with the plate means, means on the plate means for removably supporting the battery-operated device on the wall, charging means within the battery-operated device, the battery-operated device including an electrical cord connected to the charging means, and a plug on the end of the cord for cooperation with the receptacle means in the charging mode of the battery-operated device, and wherein the means on the plate means for supporting the battery-operated device on the wall comprises an integral extension on the lower portion of the plate means, the integral extension including a top tab portion, a vertically spaced bottom tab portion and a pair of horizontally spaced-apart fingers intermediately of the top and bottom tab portions, the battery-operated device having a handle with a recess formed therein, and the recess being defined by top, bottom, and side surfaces, respectively, whereby the top and bottom tab portions are lodged against the top and bottom surfaces of the recess, respectively, and whereby the side surfaces of the recess engage the respective fingers and depress the fingers inwardly thereof as the battery-operated device is positioned on the integral extension of the plate means.

11. The combination of claim 10, wherein said top tab portion, said bottom tab portion and said pair of spaced-apart fingers extend outwardly and upwardly from said plate means at an angle to horizontal, and upwardly from said plate means at an angle to horizontal, and wherein said top surface and said bottom surface of said recess correspondingly extend upwardly from horizontal so as to fittingly receive said top and bottom tab portions.

12. The combination of claim 10, further including outwardly-extending protrusions on the respective fingers, the battery-operated device having side wall portion formed with respective depressions inwardly of the side surfaces thereof, whereby the protrusions are received withing the respective depressions, and whereby the battery-operated device is mounted on the plate means with a detent action.

13. In a battery-operated device having a passive mode when the device is being charged and an active mode when the device is being discharged in use, the combination of a plate means, means for mounting the plate means on a wall, electrical outlet receptacle means associated with the plate means, means on the plate means for removably supporting the battery-operated device on the wall, charging means within the battery-operated device, the battery-operated device including an electrical cord connected to the charging means, and a plug on the end of the cord for cooperation with the receptacle means in the charging mode of the battery-operated device, wherein the plate means comprises a replacement cover plate for a wall-mounted electrical outlet receptacle, and wherein the means on the plate means for supporting the battery-operated device on the wall comprises a saddle formed integrally with the plate replacement cover plate and projecting forwardly therefrom at substantially the lowermost portion thereof, the saddle including a pair of spaced-apart, substantially parallel supporting members and the battery-operated device having a handle provided with laterally projecting ears, whereby the battery-operated device may be cradled within the saddle with the ears supported upon the respective supporting members of the saddle, and upwardly projecting strut members for the supporting members, respectively, the strut members also being formed integrally with the replacement cover plate.

14. The combination of claim 13, wherein the plate means is integrally molded from a suitable plastic material.

15. In a battery-operated device having a passive mode when the device is being charged and an active mode when the device is being discharged in use, the combination of a plate means, means for mounting the plate means on a wall, electrical outlet receptacle means associated with the plate means, means on the plate means for removably supporting the battery-operated device on the wall, charging means within the battery-operated device, the battery-operated device including an electrical cord connected to the charging means, and a plug on the end of the cord for cooperation with the receptacle means in the charging mode of the battery-operated device, wherein the plate means comprises a replacement cover plate for a wall-mounted electrical outlet receptacle, and including means on the battery-operated device for storing the cord when the battery-operated device is in use in its discharging mode, and wherein the battery-operated device has a housing including a rearwardly projecting handle, wherein the cord extends rearwardly from a first portion of the end of the handle, and wherein the means for storing the cord when the battery-operated device is in use comprises a recess formed in a second portion of the end of the handle, the second portion being disposed adjacent to the first portion.

16. In combination: a battery-operated device having a passive mode when the device is being charged and an active mode when the device is being discharged in use, the battery-operated device further having a housing including a rearwardly-projecting handle having a rearmost end portion provided with laterally projecting respective ears, a relatively short electrical cord carried by the handle and projecting rearwardly of the end portion thereof, a replacement cover plate for at least one wall-mounted electrical outlet receptacle, the replacement cover plate having a pair of spaced-apart supporting members formed integrally therewith and projecting forwardly therefrom, whereby the handle of the battery-operated device may be removably cradled in the replacement cover plate such that the respective ears are supported upon the supporting members in the charging mode of the battery-operated device, integral struts between the replacement cover plate and the respective supporting members, a plug on the end of the cord for cooperation with the receptacle in the charging mode of the battery-operated device, and a solid state charging means within the molded plug and connected to the cord of the battery-operated device.

17. The combination of claim 16, further including means for bending the cord back upon itself and retaining the plug on the handle when the battery-operated device is in use in its discharging mode.

18. In a battery-operated device having a housing and further having a passive mode when the device is being charged and an active mode when the device is being discharged in use, the combination of a relatively short electrical cord carried by the housing of the battery-operated device, a plug on the end of the cord, the plug including a pair of prongs, a solid state charging means comprising an integrated circuit disposed within the plug and adjacent to at least one of the prongs, means electrically connecting the integrated circuit between the plug and cord, means on the battery-operated device for storing the cord in the active discharging mode of the device, and means for removably supporting the battery-operated device on a wall adjacent to an electrical outlet receptacle in the passive charging mode of the device.

19. In a battery-operated device having a housing and further having a passive mode when the device is being charged and an active mode when the device is being discharged in use, the combination of an electrical cord carried by the housing of the battery-operated device; a plug on the end of the cord, the plug including a pair of metal prongs; a solid state charging means comprising a heat-producing integrated circuit disposed within the plug, adjacent to at least one of the prongs and in effective thermal communication therewith to transfer heat from said integrated circuit to said one prong; means electrically connecting the integrated circuit between the plug and the cord; plate means; means for mounting the plate means on a wall; and means carried by the plate means for removably supporting the battery-operated device adjacent to an electrical outlet receptacle in the passive charging mode of the device.

20. In a battery-operated device having a housing and further having a passive mode when the device is being charged and an active mode when the device is being discharged in use, the combination of a relatively short electrical cord carried by the housing of the battery-operated device; a plug on the end of the cord, the plug including a pair of metal prongs; a heat-producing solid state charging means within the plug and in effective thermal communication with at least one of the metal prongs to transfer and dissipate heat from the solid state charging means; means electrically connecting the solid state charging means to the cord; means on the battery-operated device for storing the cord in the active discharging mode of the device; plate means; means for mounting the plate means on a wall; and means carried by the plate means for removably supporting the battery-operated device adjacent to an electrical outlet receptacle in the passive charging mode of the device.

21. In a battery-operated device having a passive mode when the device is being charged and an active mode when the device is being discharged in use, the combination of a plate means; means for mounting the plate means on a wall; electrical outlet receptacle means carried by said plate means; means on the plate means for supporting the battery-operated device on the wall; and charging means within the battery-operated device, the battery-operated device including an electrical cord connected to the charging means and a plug including a pair of prongs on the end of the cord for cooperation with the receptacle means in the charging mode of the battery-operated device, and wherein said charging means comprising a heat-producing solid state charging means within said plug and in effective thermal communication with at least one of said prongs to transfer and dissipate heat from the solid state charging means.

22. The combination according to claim 21, including an extension power cord having a second plug on one end thereof, which may be plugged into a distant electrical recpetacle, said plate means constituting the other end thereof.

23. The combination according to claim 21, including an extension power cord having a male plug on one end thereof which may be plugged into a distant electrical receptacle and a female plug on the other end thereof which may be placed in conductive communication with the electrical receptacle carried by said plate means and within which the plug on the end of the cord is to be positioned.

24. In a battery-operated device having a passive mode when the device is being charged and an active mode when the device is being discharged in use, the combination of a plate means, means for mounting the plate means on a wall, electrical outlet receptacle means associated with the plate means, means on the plate means for removably supporting the battery-operated device on the wall, charging means within the battery-operated device, the battery-operated device including an electrical cord connected to the charging means, and a plug on the end of the cord for cooperation with the recpetacle means in the charging mode of the batter-operated device, and wherein the means on the plate means for supporting the battery-operated device on the wall comprises an integral extension on the lower portion of the plate means, the integral extension including a top tab portion, a vertically spaced apart bottom tab portion, and a pair of horizontally spaced-apart fingers intermediately of the top and bottom tab portions, the battery-operated device having a handle with a recess formed therein, and the recess being defined by top, bottom and side surfaces, respectively, whereby the top and bottom tab portions are lodged against the top and bottom surfaces of the recess, respectively, and whereby the side surfaces of the recess engage the respective finger and depress the fingers inwardly thereof as the battery-operated device is positioned on the integral extension of the plate means.

25. The combination of claim 24, further including outwardly extending protrusions on the respective fingers, the battery-operated device having side wall portions formed with respective depressions inwardly of the side walls thereof, whereby the protrusions are received within the respective depressions, and whereby the battery-operated device is mounted on the plate means with a detent action.

26. In a battery-operated device having a passive mode when the device is being charged and an active mode when the device is being discharged in use, the combination of a plate means, means for mounting the plate means on a wall, electrical outlet receptacle means associated with the plate means, means on the plate means for removably supporting the battery-operated device on the wall, charging means within the battery-operated device, the battery-operated device including an electrical cord connected to the charging means, and a plug on the end of the cord for cooperation with the receptacle means in the charging mode of the battery-operated device, and wherein the means on the plate means for supporting the battery-operated device on the wall comprises a saddle formed integrally with the plate means and projecting forwardly therefrom at substantially the lowermost portion thereof, the saddle including a pair of spaced apart, substantially parallel supporting members and the battery-operated device having a handle provided with laterally projecting ears, whereby the battery-operated device may be cradled within the saddle with the ears supported upon the respective supporting members of the saddle, and upwardly-projecting strut members for the supporting members, respectively, the strut members also being formed integrally with the plate means.

27. The combination of claim 21, wherein said means on the plate means for supporting the battery-operated device on the wall includes hook means extending from said plate means.

28. The combination of claim 27, wherein said hook means extends downwardly and outwardly from said plate means.

29. The combination of claim 28, wherein said plate means and said hook means and said plate means are integral.

30. In a combination a battery-operated device; a wall support for the battery-operated device; plug means on the device, the plug means being provided with a pair of metal prongs; plate means secured to the wall; mechanical support means on the plate means for removably supporting the device on the plate means; electrical receptacle means operatively associated with the plate means for selective cooperation with the prongs on the plug means, the electrical receptacle means being spaced from the mechanical support means; and solid state charging means in the plug means, said solid state charging means being electrically coupled to at least one of the prongs thereof and being in effective thermal communication with at least one of said metal prongs to transfer and dissipate heat from said solid state charging means.

31. In combination, a battery-operated device including a plug having a pair of metal prongs and battery charging means, the device having a passive mode when the device is being charged and an active mode when the device is being discharged in use, the battery charging means including a heat-producing solid state charging means within said plug and being in effective thermal communication with at least one of said prongs for dissipating heat produced by the solid state circuit; a plate means; means for mounting the plate means on a wall; electrical outlet receptacle means associated with the plate means; support means on the plate means for removably supporting the battery-operated device; and means for coupling said charging means to the receptacle means when the battery-operated device is supported on the support means in its passive mode.

32. The combination of claim 31, wherein the plate means comprises a replacement cover plate for a wall-mounted electrical outlet receptacle.

33. The combination of claim 31, wherein that the plate means includes at least one electrical outlet receptacle therein, cord means being provided for connecting the at least one outlet receptacle to a wall outlet.

34. The combination of claim 31, wherein the solid state charging means is an integrated circuit and is integrally within the plug.

35. The combination of claim 30, wherein said solid state charging means comprises an integrated circuit including heat sink means positioned adjacent to said one of the prongs with said heat sink means in thermal communication to said at least one of the prongs.

36. The combination according to claim 19, wherein said integrated circuit includes heat sink means for proving thermal communication to said one of said prongs.

37. The combination according to claim 20, wherein said solid state charging means comprises an integrated circuit positioned adjacent to said one of said prongs and includes a heat sink means for providing thermal communication to said one of said prongs.

38. The combination in accordance with claim 21, wherein said solid state charging means within said plug comprises an integrated circuit positioned adjacent to one of said prongs and includes a heat sink means for providing thermal communication to said one of said prongs.

39. The combination according to claim 31, wherein said solid state charging means comprises an integrated circuit having heat sink means for providing thermal communication to said one of said prongs.

* * * * *